United States Patent [19]

Gerlach et al.

[11] Patent Number: 4,564,488

[45] Date of Patent: Jan. 14, 1986

[54] METHODS FOR THE PREPARATION OF POROUS FIBERS AND MEMBRANES

[75] Inventors: Klaus Gerlach, Aschaffenburg-Obernau; Erich Kessler, Hoechst, both of Fed. Rep. of Germany

[73] Assignee: Akzo NV, Arnhem, Netherlands

[21] Appl. No.: 456,758

[22] Filed: Jan. 10, 1983

Related U.S. Application Data

[63] Continuation-in-part of Ser. No. 360,631, Mar. 22, 1982, abandoned, and Ser. No. 360,632, Mar. 22, 1982, abandoned, each is a continuation of Ser. No. 61,989, Jun. 30, 1979, abandoned, and Ser. No. 61,990, Jun. 30, 1979, abandoned.

[30] Foreign Application Priority Data

Jul. 31, 1978 [DE] Fed. Rep. of Germany ....... 2833568
Jul. 31, 1978 [DE] Fed. Rep. of Germany ....... 2833493
Jul. 31, 1978 [DE] Fed. Rep. of Germany ....... 2833623

[51] Int. Cl.$^4$ ................. B29C 67/20; B29C 47/00; C08J 9/26
[52] U.S. Cl. .................... 264/41; 210/500.2; 264/49; 264/129; 264/178 F; 264/209.1
[58] Field of Search .................. 264/41–43, 264/340, 49, 129, 178 F, 209.1; 210/500.2

[56] References Cited

U.S. PATENT DOCUMENTS

| | | | |
|---|---|---|---|
| T1,860,002 | 3/1969 | McFarren | 264/210.1 |
| 2,585,444 | 2/1952 | Coxe | 264/184 |
| 2,585,449 | 2/1952 | Rothrock | 264/184 |
| 3,443,002 | 5/1969 | Murao et al. | 264/168 |
| 3,527,804 | 9/1970 | Cyba | 264/211 |
| 3,536,796 | 10/1970 | Rock | 264/49 |
| 3,716,328 | 2/1973 | Mayer | 8/165 |
| 3,755,209 | 8/1973 | Nintz et al. | 264/49 |
| 3,922,249 | 11/1975 | Mills | 264/49 |
| 4,115,492 | 9/1978 | Mahoney et al. | 264/49 |
| 4,247,498 | 1/1981 | Castro | 264/41 |

FOREIGN PATENT DOCUMENTS 1044502  10/1966  United Kingdom .................. 264/49

*Primary Examiner*—Philip Anderson
*Attorney, Agent, or Firm*—Michael J. Striker

[57] ABSTRACT

The invention concerns porous fibers and membranes, methods for their preparation and for their use. The fibers are characterized by a smooth porous surface and an apparent density of between about 10 and 90% of the true density of the polymeric starting material employed. The process involves the formation of a homogeneous mixture of at least two components, one of which is a meltable polymer and another liquid inert with respect to the polymer. The mixture formed must be of a binary type, in which there is a temperature range of complete miscibility and a range in which there is a miscibility gap. The mixture is extruded at a temperature above the separation temperature into a bath containing at least some of the inert liquid which is at a temperature below the separation temperature. Upon introduction of the mixture into the bath, the fiber structure of the product is fixed.

13 Claims, No Drawings

METHODS FOR THE PREPARATION OF POROUS FIBERS AND MEMBRANES

CROSS-REFERENCE TO RELATED APPLICATIONS

This application is a continuation-in-part of both applications Ser. Nos. 360,631 and 360,632, both filed Mar. 22, 1982 and which are both now abandoned, which are respectively continuations of Ser. Nos. 061,989 and 061,990 both filed June 30, 1979 and which are both now abandoned.

BACKGROUND OF THE INVENTION

The invention concerns porous fibers, methods for their preparation and for their use, in particular as carrier substances for active ingredients; and membranes in the form of flat foils, tube foils or hollow fibers of synthetic polymeric materials, methods for their preparation and for their use, in particular as filters or membrane carriers or supports for separation purposes.

Methods for the preparation of some types of porous fibers, i.e., fibers with porous structure, have long been known. In many instances, these fibers are referred to as foam fibers. The East German patent DDR-PS No. 103 375, for example, describes a process in which a polymer melt of one or a number of components, preferably incompatible components, is extruded with the addition of physical and/or chemical carrier material through one or a number of rows of spinning nozzle holes, which may be round, concave or concave-profiled. The thus-produced fibers can be worked up through the corresponding procedures into fleeces.

The prior art fibers with porous spaces exhibit numerous disadvantages. Some processes have therefore been developed which lead to fibers with pore spaces only in the interior; the surface is either completely closed or in any case exhibits a very limited porosity. Other types of fibers with openings in the surfaces in contrast have rough surfaces unsuitable for many uses.

There exists therefore a need for better methods of preparing such fibers, in particular methods which allow for simple preparation of extrudable spinning solutions and which obviate the need for complicated spinning baths. There is further the need for improved porous fibers which have even surfaces in spite of their having openings in the surface.

Similarly, membranes in the form of flat foils, tube foils or hollow fibers have been known to the art for quite some time. A number of methods are available to the person skilled in the art for preparation of such membranes from the most diverse polymers. Hollow fibers find use in the production of textile products; they also find use in filtration, ultrafiltration, microfiltration, dialysis, reverse osmosis, etc.

When used in separation devices, these membranes in the form of flat foils, tube foils or hollow fibers are selected on the basis of their permeability and selectivity, for the membranes should on the one hand be retentive of certain materials, and on the other hand, freely permeable to others, such as the solvent in a solution.

Foils with microporous or porous structure have been known for some time. So, for example, in DE-OS No. 27 37 745 a process for the preparation of foils of porous or microporous structure is described. The therein-described structures are without doubt valuable products which find use in a large number of fields.

In further investigation of the above teachings, however, it has been determined that the foils prepared thereby have a closed surface. In particular, it is not possible to obtain foils which have perceptible open pores on both surfaces. There remains therefore the need for improved methods for preparing porous foils characterized by good permeability coupled with high selectivity, and which in addition exhibit open pores on both surfaces while at the same time having flat even surfaces.

A method for the preparation of selectively permeable hollow fibers is described in DE-AS No. 14 94 579, in which an intimate mixture of a thermoplastic polymer with a plasticizer is melt spun and the plasticizer ultimately extracted from the thus-obtained hollow fiber. Thus, it is necessary that the plasticizer be easily and essentially completely extractable from the spun hollow fiber. Frequently this requires a comparatively long work time for complete extraction of the fiber, and it is not always possible to remove the plasticizer completely. Moreover, the hollow fibers prepared according to this method exhibit relatively low permeabilities. Finally, it is possible to vary the proportions of plasticizer and polymer within but a narrow range; at high plasticizer concentration, no fiber formation occurs; at low plasticizer concentrations, the permeability achieved is insufficient for most uses. There is further the danger that if the plasticizer is not sufficiently mixed with the thermoplastic polymer, there will be agglomerations which lead, after washing, to holes or oversize pores which preclude use of the hollow fibers for many purposes.

Another process for the preparation of hollow fibers is described in DE-AS No. 23 46 011, in which a solution of acrilonitrile copolymerizate is spun in an aqueous solution of mineral salts. For internal coagulation, it is necessary that coagulant be sprayed into the interior of the fiber. This process is comparatively complicated, and it is difficult to obtain hollow fibers with constant properties.

In U.S. Pat. No. 3,674,638 a process is described, in which first a solution of fiber-forming polymer is spun, then the exterior and generally the internal zones are treated to gel formation and simultaneously or subsequently coagulated. Thereby is obtained a hollow fiber which has a skin-type structure both on the inside and on the outside. This process is also comparatively complicated, and the permeability of these hollow fibers leaves much to be desired.

Thus, although many examples of membranes in the form of flat foils, tube foils and hollow fibers are known, there is always the need for improved membranes, in particular of the type which can be easily prepared from simple spinning solutions and without the need for complicated baths. There is further the need for improved membranes which are porous and which are characterized by good permeability coupled with a simultaneous high selectivity.

SUMMARY OF THE INVENTION

It is therefore an object of the invention to prepare fibers which can be distinguished over the prior art foam fibers through their porous surfaces and which can be used not only in the textile field but also in technological sectors for a wide variety of uses, including as carrier substrate for known active agents.

Another object of the invention is to prepare porous membranes which are distinguishable from the known types of membranes in an open porous surface both on the outside and the inside walls, but which nevertheless have flat surfaces with open pores. In conjunction with this object it is desired to prepare membranes which can be used not only in textiles but also in the technical and medical sectors, such as in separation processes and in particular as filters, microfilters, membrane carriers and carrier substrates for certain substances.

With regard to the preparation, a goal of the invention is to provide a method whereby polymers can be converted into an extrudable spinning solution in a simple manner and which allows for simultaneous extrusion and setting of the extruded materials without the need for complicated spinning techniques or baths.

A method should allow for the preparation of fibers of varying porosity solely through adjustment or variation of the operational parameters.

These and other goals are achieved through the fibers prepared according to the inventive process, which can be characterized in that one prepares a homogeneous mixture of at least two components, one of which is a meltable polymer and the other a liquid inert to the polymer which forms a binary system with the polymer such that in the liquid aggregate state there is a range of full miscibility and a range with a miscibility gap. This mixture is extruded at a temperature above the separation or segregation temperature into a bath containing at least some inert liquid of the type in the extruded mixture and at a temperature below the separation temperature, at which point the fiber structure is fixed. The thus-prepared fiber structure can be washed with a solvent after fixing; among others, acetone is well suited for this purpose.

It is advantageous if an air gap occurs between the output surface of the extruder and the surface of the bath. This air gap can be heated. It is also possible to extrude the homogeneous mixture directly into the bath.

In a special embodiment of the inventive process, a temperature-step bath is employed. The bath in such a case consists of one or more portions with a temperature gradient of the type in which the temperature from the beginning of the spinning bath until the end is continuously reduced. It is also possible to use two or more separate baths, each of which may have a different temperature.

It has been found to be particularly advantageous, if the bath has a temperature at least 100° C. lower than the separation temperature of the binary mixture employed. According to the invention, homogeneous mixtures from 10 to 90 weight % polymer and 90 to 10 weight % inert liquid can be extruded.

The homogeneous mixture can also be extruded into a spinning tube or conduit located before the bath and filled with the bath liquid.

In a preferred embodiment, the polymer used is polypropylene and the inert liquid, N,N-bis-(2-hydroxyethyl)hexadecylamine.

It is advantageous to mix the two components, namely the melted polymer and the inert liquid, continuously before the extrusion; it is desirable to carry out this mixing immediately before extrusion. The mixture can also be homogenized before extrusion. For this mixing, a pin or rod mixer is particularly suitable.

These objects are achieved through membranes in the form of flat foils, tube foils or hollow fibers of synthetic polymers characterized by a 10 to 90 volume % proportion of pores in combination with one another and flat open porous surfaces, in which the proportion of open pores in the surface is between about 10 to 90%. The apparent density of the hollow fibers lies between about 10 and 90% of the true density of the polymer employed; the permeability coefficient of the hollow fibers is at least $10.10^{-12}$ cm$^2$.

The membranes can be used as filters, in particular as filters for microfiltration. The membranes can also serve as membrane carriers, i.e., a coating may be applied to the membrane, which coating also serves as a membrane, generally with different permeability and selectivity properties. The membranes can also be used as carrier substrates, e.g., the membranes are impregnated with certain substances, which are released at a later time. The membranes can also be used as oxygenators.

For carrying out the inventive process and for preparation of fibers according to the invention, conventional, fiber-forming macromolecular substances, e.g., those prepared by polymerization, polyaddition or polycondensation, may be employed. It is, however, necessary that the polymer be meltable, i.e., that it can be converted into the liquid aggregate state without decomposition. It is also necessary that it form a binary system with the inert liquid; as noted previously, in this liquid aggregate state there must be a range of full miscibility as well as a range with a miscibility gap.

These types of systems exhibit for the liquid state a phase diagram of the type which, for example, may be found in the Textbook of Physical Chemistry, S. Glasstone, Macmillan & Co. Ltd., St. Martin's Street, London (1953) on page 724 for the system aniline/hexane. In this diagram, the range above the curve respresents full miscibility; below the curve, two liquid phases are present in equilibrium.

For carrying out the invention, it is not absolutely necessary, that in the two-phase range both components exhibit a noticeable solubility with respect to the other component, as is the case in the above-noted diagram. In many cases it is sufficient, if in the liquid two-phase range there is only a marginal solubility. It is nonetheless necessary that both components as liquids form two liquid phases. In this respect the inventive systems are distinguished from those in which the dissolved polymer precipitates out directly with a lowering of the temperature without passing through the liquid aggregate state during the cooling.

Within the scope of the invention, customary meltable polymers may be used, such as polyethylenes, polypropylenes, polyvinyl chlorides, polyacrylates, polycaprolactams and corresponding copolymers as well as many others obtained through polymerization; polycondensation products such as polyethyleneterephthalate, polybutyleneterephthalate, polyphenylene oxide, polyamide-6,6, etc.; and polyaddition products, e.g., polyurethanes and polyureas.

As inert liquid, any liquid which forms the type of binary system described above with the polymers in liquid state would in principle be suitable. A liquid is considered inert to the polymer if within a short time interval there is no noticeable destruction of the polymer or reaction with the polymer itself.

Even though the above-noted diagram of the system aniline/hexane shows the compositions for a binary mixture, which in and of itself comprises two essentially pure, individual substances, the invention itself is not limited narrowly to binary systems in which there are only two pure individual substances. For example, one skilled in the art recognizes that polymeric substances are in themselves mixtures of molecules with a wide range of molecular weights; thus, polymers of this type with a corresponding molecular weight distribution should be considered for purposes of the invention as one component, as is the case with mixed polymers. Under certain circumstances, polymer mixtures can also behave like a single component, forming a single phase mixture with an inert solvent which separates into only two phases below the critical temperature. Preferably, only a single polymer is used. In addition, the liquid need not be absolutely pure, nor need it necessarily be a single homogeneous substance. Thus, it is not necessarily deleterious to the process if small amounts of impurities, perhaps even components of homologous compounds, are present, as often is the case in large-scale technical operations.

For a practical carrying out of the process, a homogeneous mixture of the two components is prepared at the required temperature. For example, comminuted polymer can be mixed with the inert liquid and heated to the necessary temperature for thorough mixing.

Another suitable process is one in which the two components are heated to the necessary temperature separately and the two components are only mixed together in the desired proportion in a continuous manner shortly prior to extrusion. This mixing may be effected in a pin or rod mixer, which advantageously is located between the dosing pump for the single components and the spinning pump. A final homogenization can be effected if desired.

It is often desirable to degas the homogeneous mixture by application of a vacuum prior to extrusion.

The ratio of polymer to inert liquid in the spinning solution can vary within wide ranges. By adjustment of the ratio of polymer to inert liquid, one can to a large extent determine the pore volume as well as the number of open pores on the surface of the porous fiber obtained. Through this manner, one may obtain a wide variety of the most diverse porous fibers for many different types of uses.

In general, it is sufficient if the temperature of the homogeneous mixture before extrusion is only a few degrees above the critical temperature (separation temperature) of the mixture. By increasing the difference between the temperature of the mixture before extrusion and the separation temperature, interesting effects with respect to the structure can be achieved in the prepared fibers.

The homogeneous spinning solution is then extruded into a bath which contains the inert liquid in the extruded component mixture and is at a temperature below the separation temperature. Preferably, the bath consists entirely or for the most part of the inert liquid in the extruded mixture. The temperature of the bath is below the temperature at which the components of the mixture are fully and homogeneously miscible with one another. The temperature of the bath is preferably at least 100° C. below the separation temperature of the mixture employed.

The temperature can also be so low that, with respect to the corresponding phase diagram of the binary system, it is already in the range in which a solid phase appears.

If the temperature of the bath is so high that it is still in the liquid two-phase range, it is then advantageous, in order to fix the fiber structure as quickly as possible, to reduce the temperature after a determined distance within the bath.

It is important that the extruded mixture, before it is introduced into the bath, is still one phase, i.e., that there has been essentially no separation into two phases.

It has been found to be advantageous, if in certain cases a spinning tube or pipe is arranged before the bath, into which it is immersed and likewise filled with the bath liquid. The spinning tube can have at its inlet a customary spinning funnel, and can be curved at its lower end to facilitate passage of the fiber through the bath.

Filling of the spinning tube may be effected through overflow by means of a levelling device surrounding the spinning tube; in order to insure complete filling and control of the level in the spinning tube it is necessary to supply more bath liquid to the levelling device from a main reservoir than flows through the spinning tube. The excess bath liquid can be returned to the main reservoir through a second overflow in the levelling apparatus. Both the main reservoir and the levelling device may be equipped with thermostatic controls.

The fibers or membranes can be washed out with suitable extraction media after emergence from the spinning bath. For this extraction, a range of solvents are suitable, for example, acetone, cyclohexanone, ethanol and others as well as mixtures of such liquids.

In some cases, it is not advantageous to wash out the fibers or membranes; in particular, this is so when the inert liquid used imparts to the fibers additional characteristics desirable in their subsequent uses, or where the inert liquid itself will serve a function in subsequent use. Thus, for example, the inert liquid may be chosen to impart antistatic properties to the fibers, or to serve as a lubricant.

It has been found to be desirable for a range of types of uses if between the output surface of the extruder, i.e., the output surface of the corresponding fiber nozzle and the surface of the bath there is an air gap. Through variation of the air gap it is possible to modify the structure of the fiber obtained, and in particular of its surface.

It has been found that through lengthening of the air gap the number of open pores in the surface of the fibers is reduced, while a shortening thereof leads to a corresponding increase; in addition, the diameter of the pores decreases with increasing air gap.

The air gap can be heated, preferably to a temperature above the separation temperature of the extruded mixture.

In general, the air gap is at least about 1 mm wide and can take according to the working parameters a length of up to about 10 cm. It is important, however, that no separation into two phases, or at the very least no noticeable separation, occurs in the air gap prior to introduction of the mixture into the bath. As has been noted, this can be controlled by the length of the travel path or by heating; in addition, a premature separation can be prevented by increasing the output speed of the nozzle.

In a special embodiment of the invention process, the homogeneous mixture is extruded immediately into the bath; in this manner, the surface prepared has open pores with maximum diameter.

On account of their special surface structures and interior structures, the fibers are particularly suited as substrates for certain substances. The fibers may be impregnated with antistatic agents, which may be introduced as inert liquid already during the spinning process or at a later time, after preparation of the fiber, for example by impregnation of the agent into the fiber structure.

In this manner, bodies with long term effectiveness can be prepared; these items will only slowly release the active agent taken up. Conversely, the fibers may be used for adsorption of substances.

The fibers also may be used in various textile uses, e.g., in the formation of sheet-form material, such as webs or fleeces; a further type of use is insulation, for example, heat insulation or sound absorption.

The membranes obtained according to the invention are quite advantageously used as filters. In particular, they find exceptional use in microfiltration and in ultrafiltration systems. They are also especially suited for use in the medical field, where they for example are useful for separation of bacteria on account of their selectivity, or as in the filtration of blood, e.g., separation of blood platelets, etc. They are also quite suited for use as oxygenators, in which oxygen is passed through the interior of the membrane while blood is circulated around the outside.

For a whole range of uses, the membranes may also serve as membrane carrier for other membrane surfaces. On account of the exceptionally flat surfaces of the membranes with open pores, the inventive membranes allow for the application of a material which forms a membrane, such as by coating or spraying with a corresponding film-forming solution; in this manner, a thin yet strongly attached coating of a membrane-forming material may be applied. On account of the exceptional properties of the surfaces of the inventive membranes, this type of coating adheres well to the surface. The coating solution, without penetrating or dropping through the surface into the interior of the fiber, can very easily be applied to the fibers as a thin coating or skin, thereby allowing the preparation of extremely effective membrane combinations for the widest range of possible uses.

According to the invention, foils of customary dimensions may be prepared, e.g., foils of a thickness from about 20 microns up to a few millimeters can be prepared. These foils may be in the form of flat or of tube foils. The foils can also be prepared for use in insulation, e.g., heat insulation or sound adsorption.

According to the invention, hollow fibers within a broad range of dimensions may be prepared. Thus, for example, external diameters up to some millimeters can be achieved, and the wall thicknesses are widely variable, lying for example between about 20 microns and about 1 to 2 millimeters.

The pores in the inventive fibers can take the most variegated forms. Thus, for example they may be round or elongated, and are in combination with each other, in part through small combined cavities, in part through direct passage one over the other. With fibers from a mixture containing about 30% polymer, the polymer may form the matrix, in which the isolated pores are separated and form cavities more or less discrete but nonetheless combined one with the other. On the other hand, structures can be prepared in which the cavities, as in a fleece, form the matrix, and the polymeric substance is in quasifibrellous form. The boundary between these two structures is not a fixed one, and mixtures appear in part; the structural form can be modified through other factors, such as output speed, cooling speed and time delay below the nozzle.

The inventive membranes distinguish themselves in particular through a high permeability towards gases such as nitrogen and air. The permeability can be given in terms of the so-called permeability coefficient K, as further described on page 10 of the book *Flow of Fluids Through Porous Materials*, R. E. Collins, Reinhold Publishing Co., New York (1961). K is defined as $$K = \frac{Q \cdot \eta}{A(\Delta P/h)}$$

in which Q is the volume stream per unit time (e.g., m$^3$/s), $\eta$ the viscosity of the streaming medium (Pa·s), A the average surface through which the gas flows, $\Delta P$ the pressure difference (Pa) and h the wall thickness.

The permeability coefficient of the inventive membranes is at a minimum $10 \cdot 10^{-12}$ cm$^2$, preferably is at least $22 \cdot 10^{-12}$ cm$^2$, and can reach values over $100 \cdot 10^{-12}$ cm$^2$.

The membranes in the form of flat foils or tube foils are evaluated with respect to this coefficient using nitrogen forced under pressure against a foil fastened in a flange. With the aid of a flow meter the amount of gas passing through the foil is determined.

In foils of the invention, prepared from a mixture of 30 weight % polypropylene and 70 weight % N,N-bis-(2-hydroxyethyl)-hexadecylamine with an air gap between the nozzle and the bath, the following values may be obtained:

| K($10^{-12}$ cm$^2$) | Air gap (mm) |
|---|---|
| 52 | 5 |
| 27 | 10 |

With hollow fiber membranes, the measurement is carried out in the following manner:

31 cm long hollow fibers are embedded with the help of a hardening polyurethane solution in two 5 cm long PVC-hoses. After the polyurethane has hardened, a PVC hose is attached, the open end joined through a connection to a nitrogen tank, and the end of the other hose tightly closed with a stopper. The flow of gas through the fiber is measured with a flow meter.

With membrane hollow fibers of the invention, prepared from a mixture of 30 weight % polypropylene and 70 weight % N,N-bis-(2-hydroxyethyl)-hexadecylamine with an air gap between the nozzle and the bath, the following values may be obtained:

| K($10^{-12}$ cm$^2$) | Air gap (mm) |
|---|---|
| 99 | 3 |
| 22 | 20 |

The novel features which are considered as characteristic for the invention are set forth in particular in the appended claims. The invention itself, however, both as to its construction and its method of operation, together with additional objects and advantages thereof, will be best understood from the following description of specific embodiments.

The invention may be better understood by means of the following examples:

EXAMPLE 1

In an extruder at a temperature between 260° and 280° C. polypropylene with a melting index of 1.5 g/10 min is melted and dosed into an effective pin or rod mixer via a geared pump.

Simultaneously, N,N-bis-(2-hydroxyethyl)-hexadecylamine is dosed into the mixer via a separate conduit by means of a double plunger pump through a circulation heater where it is prewarmed up to 135° C.

The composition of the mixture in terms of polypropylene: amine is about 30:70. The turning rate of the mixer is about 400 rotations/min.

After passage through the mixer the two substances which are now homogenized are fed by means of a geared pump at a rate of 15 g/min into a hollow fiber nozzles with an internal diameter of 2000 μm and a free annular clearance or ring slot of 400 μm. Through introduction of 4 L h nitrogen into the gas capillary of the nozzle, preparation of a hollow fiber is achieved.

The liquid-melt fiber produced falls through an air gap of 3 mm into the spinning funnel filled with the amine as bath liquid and through the spinning tube with a diameter of 8 mm and a length of 400 mm. It then passes through a 1 m spinning bath at a rate of about 7 m/min and is then taken up on a wind-up device.

The hollow fibers obtained are extracted with alcohol and freed of amine. The fibers have a diameter of 2200 μm and a lumen of 1400 μm.

EXAMPLE 2

Polypropylene fragments are melted in an extruder and dosed into a pin or rod mixer via a geared pump. Simultaneously, N,N-bis-(2-hydroxyethyl)-hexadecylamine preheated in the storage tank to 40° C. is fed via a double plunger pump into an electric heating device from where it is fed at a temperature of about 150° C. into the mixer. A pin or rod mixer is used as mixer.

After homogenizing the two components the melt is fed by a measuring pump through a slit nozzle and extruded into a bath of pure N,N-bis-(2-hydroxethyl)-hexadecylamine at a temperature of about 50° C.

After passage of the flat foil through the bath, which has a length of 50 cm, the foil is extracted with ethanol and dried. The foil obtained has exceptional membrane properties and a particularly desirable surface structure.

EXAMPLE 3

The following polymer/inert liquid systems may also be used according to the invention:

(a) polyethylene (low pressure)/1-dodecanol: polymer is melted at 240° C.; mixed with dodecanol at 200° C.; mixing ratio 75:25 (dodecanol/polymer); bath temperature 20° C.; otherwise, as in Example 2.

(b) high pressure polyethylene/methylnonylketone: polymer is melted at 230° C.; mixed with ketone at 178° C.; mixing ration 70:30; bath temperature 40° C.; otherwise, as in Example 2.

(c) polymethylpentene/2-undecanol: polymer is melted at 250° C.; mixed with liquid at 230° C.; mixing ratio 70:30; bath temperature 20° C.; otherwise, as in Example 2.

In each case, extraction with isopropanol.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A process for preparation of porous fibers and membranes in the form of flat foils, tube foils or hollow fibers, comprising forming a homogeneous mixture of at least two components, wherein one component is a meltable polymer and a second component is a liquid inert to said polymer which forms a binary mixture with said polymer in its liquid state, said binary mixture in liquid aggregate form exhibiting a temperature range of complete miscibility and a range with a miscibility gap; and extruding said mixture at a temperature above the temperature at which said components separate directly into a bath containing at least some of said inert liquid, said bath having a temperature below said separation temperature, whereby the fiber structure of said porous fiber is fixed.

2. A process as defined in claim 1, wherein said fiber is washed after fixing with a solvent.

3. A process as defined in claim 2, wherein said solvent is acetone.

4. A process as defined in claim 1, wherein the temperature of said bath is at least 100° C. below said separation temperature of said binary mixture.

5. A process as defined in claim 1, wherein said homogeneous mixture is extruded into a spinning tube arranged before said bath and filled with bath liquid.

6. A process as defined in claim 1, wherein said polymer is polypropylene.

7. A process as defined in claim 1, wherein said inert liquid is N,N-bis-(2-hydroxyethyl)-hexadecylamine.

8. A process as defined in claim 1, wherein said polymer and said liquid are selected from the group of polymer/liquid systems consisting of low pressure polyethylene/1-dodecanol, high pressure polyethylene/methylnonylketone, and polymethylpentene/2-undecanol.

9. A process as defined in claim 1, wherein said bath is a temperature-step bath comprising two or more separate baths, each of which has a different temperature.

10. A process as defined in claim 1, wherein said mixture comprises between about 10 to 90 weight % polymer and about 90 to 10 weight % inert liquid.

11. A process as defined in claim 1, wherein said components are continuously mixed prior to extrusion.

12. A process as defined in claim 1, wherein said mixing is effected by means of a rod or pin mixer.

13. A process as defined in claim 1, wherein said bath is a temperature-gradient bath comprising one or more portions with a temperature gradient of the type in which the temperature from the beginning of the bath until the end is continuously reduced.

* * * * *